US011799829B1

(12) United States Patent
Gurinaviciute et al.

(10) Patent No.: US 11,799,829 B1
(45) Date of Patent: *Oct. 24, 2023

(54) CUSTOMIZED FILTERING OF TRANSMISSIONS FROM A DEVICE

(71) Applicant: UAB 360 IT, Vilnius (LT)

(72) Inventors: Juta Gurinaviciute, Vilnius (LT); Carlos Eliseo Salas Lumbreras, Vilnius (LT)

(73) Assignee: UAB 360 IT, Vilnius (LT)

( * ) Notice: Subject to any disclaimer, the term of this patent is extended or adjusted under 35 U.S.C. 154(b) by 0 days.

This patent is subject to a terminal disclaimer.

(21) Appl. No.: 17/954,310

(22) Filed: Sep. 27, 2022

Related U.S. Application Data

(63) Continuation of application No. 17/952,295, filed on Sep. 25, 2022, now Pat. No. 11,611,533.

(51) Int. Cl.
*H04L 9/40* (2022.01)
(52) U.S. Cl.
CPC ...... *H04L 63/0227* (2013.01); *H04L 63/0236* (2013.01)
(58) Field of Classification Search
CPC .................. H04L 63/0227; H04L 63/0236
See application file for complete search history.

(56) References Cited

U.S. PATENT DOCUMENTS

| 2014/0053239 | A1 | 2/2014 | Narayanaswamy | |
| 2015/0188949 | A1* | 7/2015 | Mahaffey | H04L 41/0894 726/1 |
| 2019/0109820 | A1 | 1/2019 | Clark et al. | |
| 2021/0099843 | A1* | 4/2021 | Yang | H04W 12/76 |

\* cited by examiner

*Primary Examiner* — Huan V Doan
(74) *Attorney, Agent, or Firm* — The Pattani Law Group

(57) ABSTRACT

A method including configuring a security device to receive registration information indicating groups of user devices; configuring the security device to receive policy information indicating respective filtering policies for each group of user devices; configuring the security device to receive a transmission packet for transmission to a destination device over an open internet; configuring the security device to determine, based on the registration information, the group of user devices to which the user device belongs; configuring the security device to determine, based on the policy information and on determining the group to which the user device belongs, whether the user device is permitted to transmit the transmission packet; and configuring the security device to selectively block transmission of the transmission packet based on determining whether the user device is permitted to transmit the transmission packet is disclosed.

20 Claims, 7 Drawing Sheets

CUSTOMIZED FILTERING OF TRANSMISSIONS FROM A DEVICE

CROSS REFERENCE

This application is a continuation of U.S. Non-Provisional patent application Ser. No. 17/952,295, filed on Sep. 25, 2022, and titled "Customized Filtering Of Transmissions From A Device," the entire contents of which are incorporated herein by reference.

FIELD OF DISCLOSURE

Aspects of the present disclosure generally relate to network services, and more particularly to customized filtering of transmissions from a device.

BACKGROUND

A user device may rely on a network to communicate information and/or to communicate messages with another user device. Such information and/or messages may include private information and/or sensitive data associated with the user device. The communication over the network may be vulnerable as being susceptible to a cybercrime, through which a malicious entity may attempt to steal, alter, disable, expose, or destroy the information through unauthorized access to the communicating user devices. A cybercrime may include, for example, a malware attack, a phishing attack, a ransomware attack, a virus attack, etc. As a result, cyber security measures may be used to prevent occurrence of the cybercrime and/or to mitigate risks associated with the cybercrime.

SUMMARY

In one aspect, the present disclosure contemplates a method including receiving, by a security device from a user device that is in a private network, a transmission packet for communication to a destination device over the open internet; determining, by the security device based at least in part on an internet protocol (IP) address associated with the destination device, whether the user device is permitted to transmit the transmission packet to the IP address over the open internet; determining, by the security device based at least in part on determining that the user device is permitted to transmit the transmission packet to the IP address, whether the user device is permitted to transmit the transmission packet to a port associated with the IP address; determining, by the security device based at least in part on determining that the user device is permitted to transmit the transmission packet to the port, whether the user device is permitted to utilize a protocol utilized by the user device to transmit the transmission packet; and determining, by the security device based at least in part on determining that the user device is permitted to utilize the protocol, whether the user device is permitted to utilize a web application utilized by the user device to transmit the transmission packet.

In another aspect, the present disclosure contemplates a device comprising a memory and a processor communicatively coupled to the memory, the memory and the processor configured to: receive, from a user device that is in a private network, a transmission packet for communication to a destination device over the open internet; determine, based at least in part on an internet protocol (IP) address associated with the destination device, whether the user device is permitted to transmit the transmission packet to the IP address over the open internet; determine, based at least in part on determining that the user device is permitted to transmit the transmission packet to the IP address, whether the user device is permitted to transmit the transmission packet to a port associated with the IP address; determine, based at least in part on determining that the user device is permitted to transmit the transmission packet to the port, whether the user device is permitted to utilize a protocol utilized by the user device to transmit the transmission packet; and determine, based at least in part on determining that the user device is permitted to utilize the protocol, whether the user device is permitted to utilize a web application utilized by the user device to transmit the transmission packet.

In another aspect, the present disclosure contemplates a non-transitory computer readable medium storing instructions, which when executed by a processor configures the processor to: receive, from a user device that is in a private network, a transmission packet for communication to a destination device over the open internet; determine, based at least in part on an internet protocol (IP) address associated with the destination device, whether the user device is permitted to transmit the transmission packet to the IP address over the open internet; determine, based at least in part on determining that the user device is permitted to transmit the transmission packet to the IP address, whether the user device is permitted to transmit the transmission packet to a port associated with the IF address; determine, based at least in part on determining that the user device is permitted to transmit the transmission packet to the port, whether the user device is permitted to utilize a protocol utilized by the user device to transmit the transmission packet; and determine, based at least in part on determining that the user device is permitted to utilize the protocol, whether the user device is permitted to utilize a web application utilized by the user device to transmit the transmission packet.

Aspects generally include a method, an apparatus, a system, a device, a computer program product, a non-transitory computer-readable medium, a control infrastructure, a wireless communication device, and/or processing system as substantially described herein with reference to and as illustrated by the drawings and specification.

It is to be understood that both the foregoing general description and the following detailed description are exemplary and explanatory in nature and are intended to provide an understanding of the present disclosure without limiting the scope thereof. In that regard, additional aspects, features, and advantages of the present disclosure will be apparent to one skilled in the art from the following detailed description.

BRIEF DESCRIPTION OF THE DRAWINGS

The accompanying drawings illustrate aspects of systems, devices, methods, and/or mediums disclosed herein and together with the description, serve to explain the principles of the present disclosure. Throughout this description, like elements, in whatever aspect described, refer to common elements wherever referred to and referenced by the same reference number. The characteristics, attributes, functions, interrelations ascribed to a particular element in one location apply to those elements when referred to by the same reference number in another location unless specifically stated otherwise.

The figures referenced below are drawn for ease of explanation of the basic teachings of the present disclosure; the extensions of the figures with respect to number, position, relationship, and dimensions of the parts to form the following aspects may be explained or may be within the skill of the art after the following description has been read and understood. Further, exact dimensions and dimensional proportions to conform to specific force, weight, strength, and similar requirements will likewise be within the skill of the art after the following description has been read and understood.

The following is a brief description of each figure used to describe the present disclosure, and thus, is being presented for illustrative purposes only and should not be limitative of the scope of the present disclosure.

Figure 1:
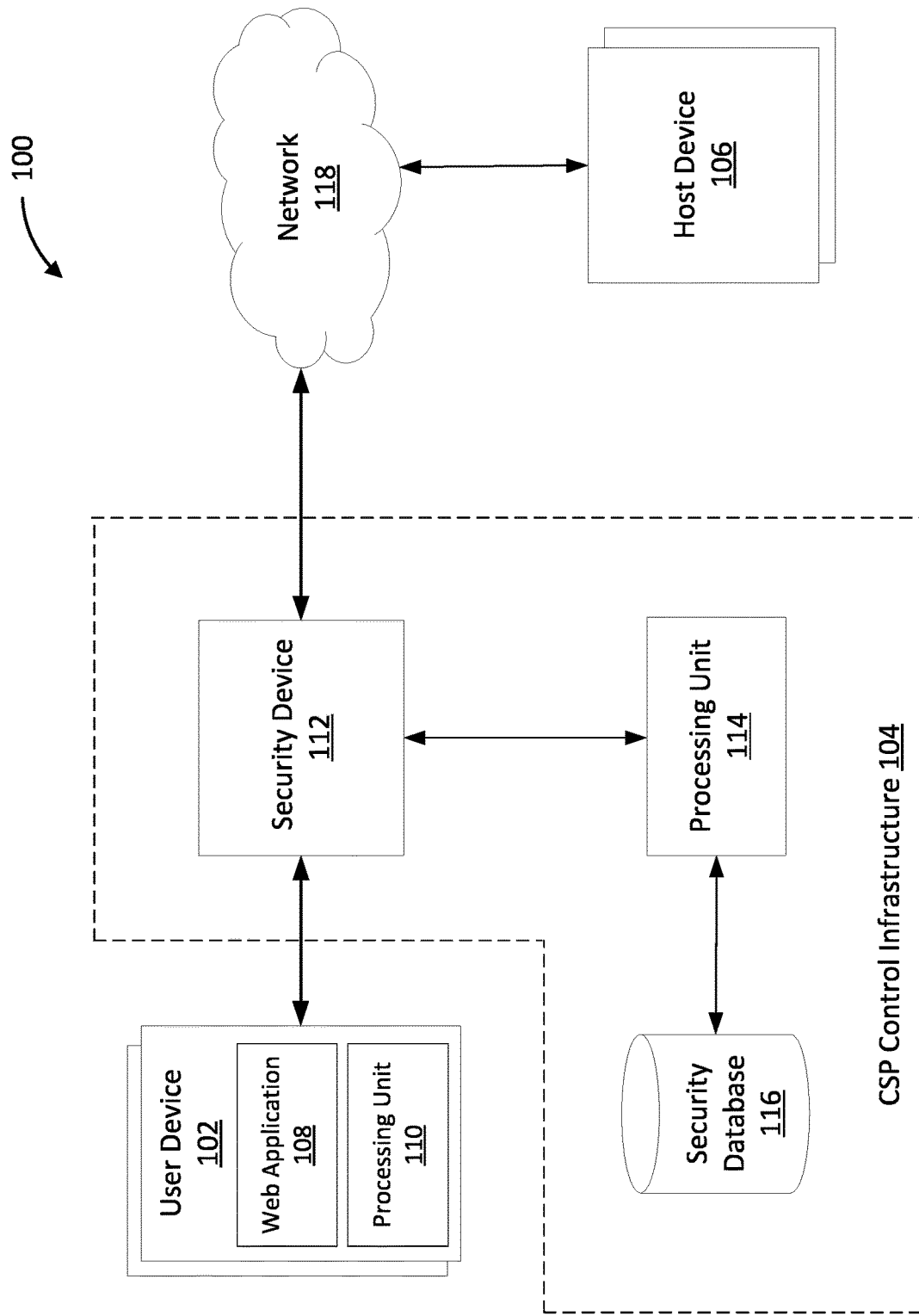

FIG. 1 is an illustration of an example system associated with customized filtering of transmissions from a device, according to various aspects of the present disclosure.

Figure 2:
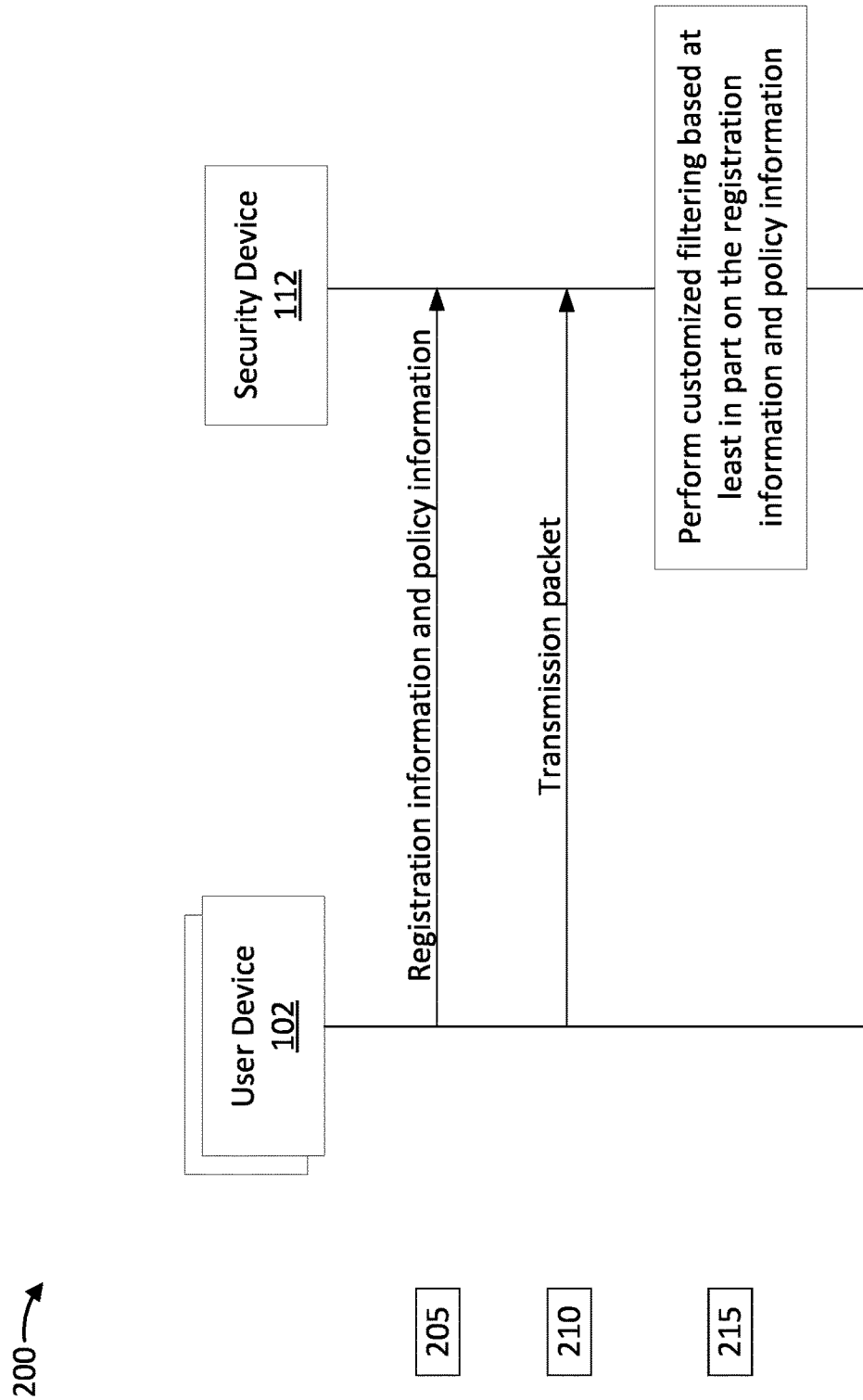

FIG. 2 is an illustration of an example flow associated with customized filtering of transmissions from a device, according to various aspects of the present disclosure.

Figure 3:
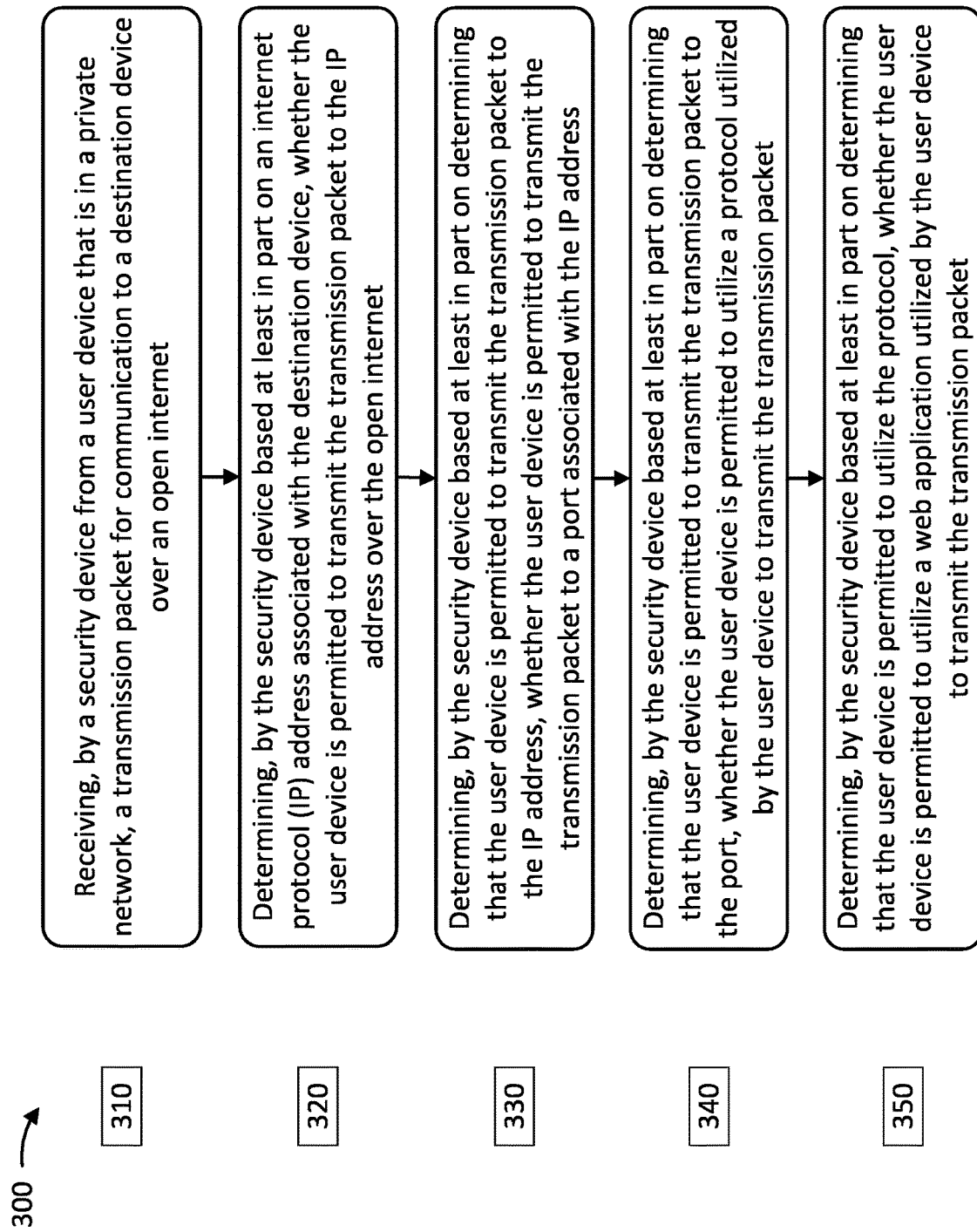

FIG. 3 is an illustration of an example process associated with customized filtering of transmissions from a device, according to various aspects of the present disclosure.

Figure 4:
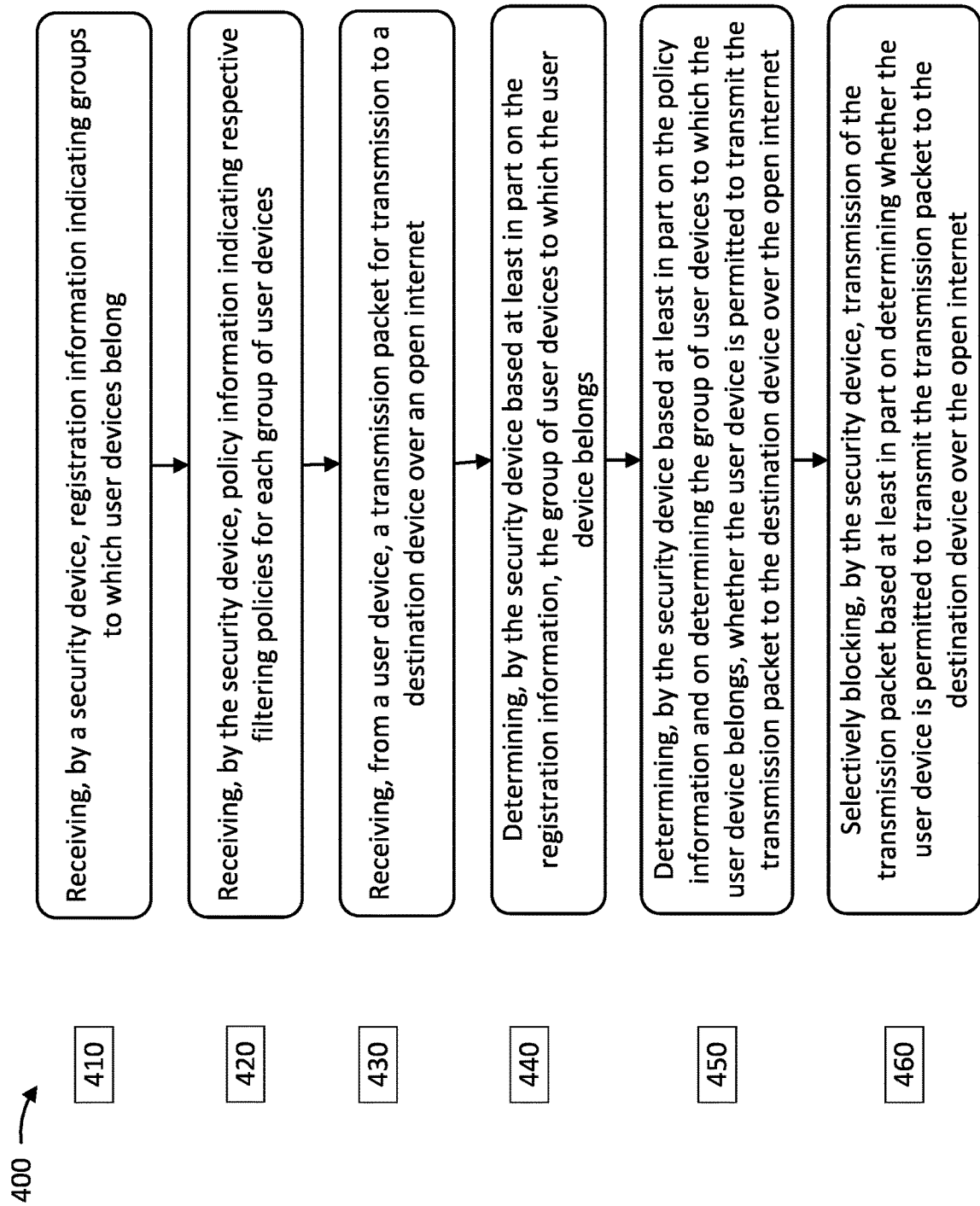

FIG. 4 is an illustration of an example process associated with customized filtering of transmissions from a device, according to various aspects of the present disclosure.

Figure 5:
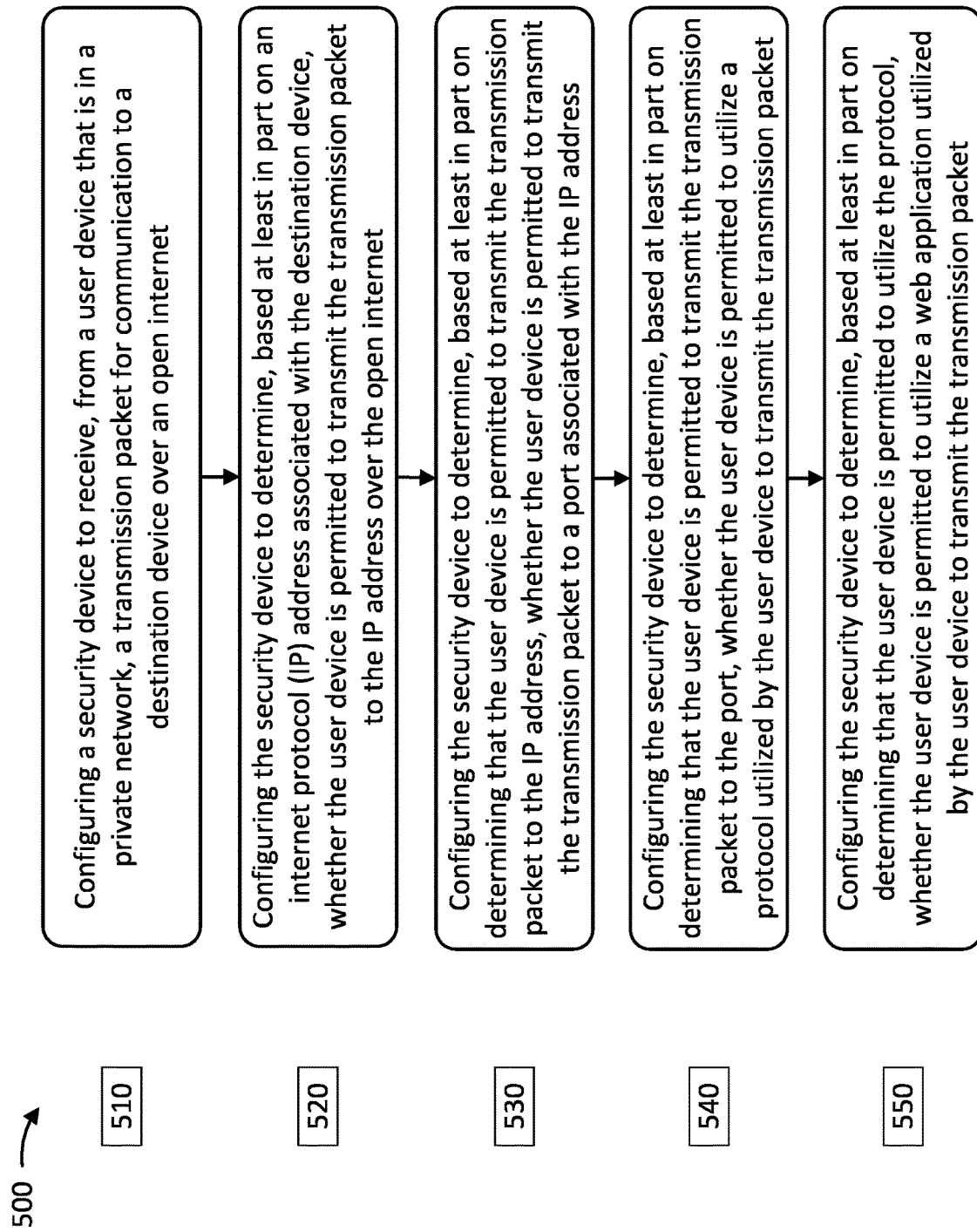

FIG. 5 is an illustration of an example process associated with customized filtering of transmissions from a device, according to various aspects of the present disclosure.

Figure 6:
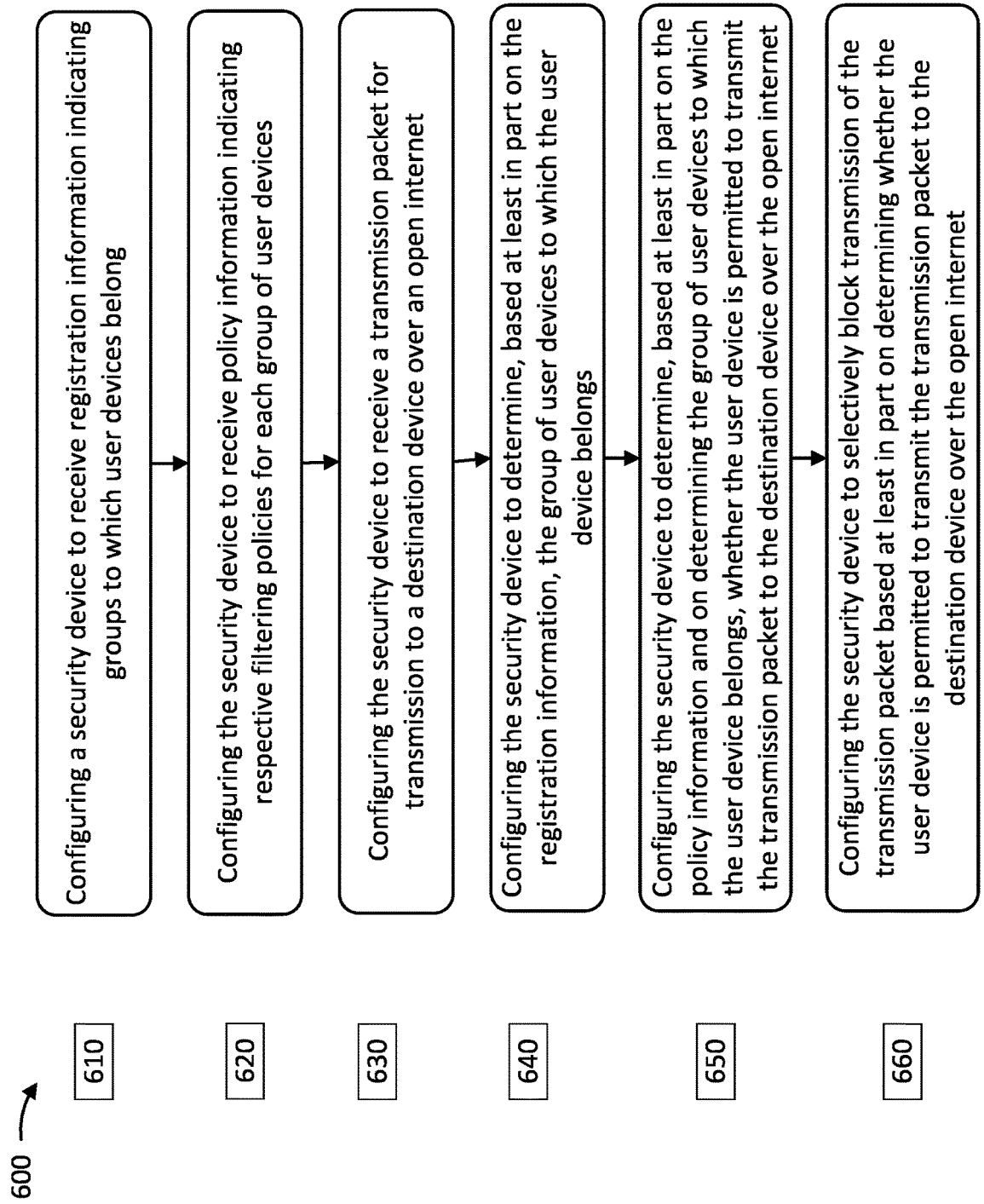
Figure 7:
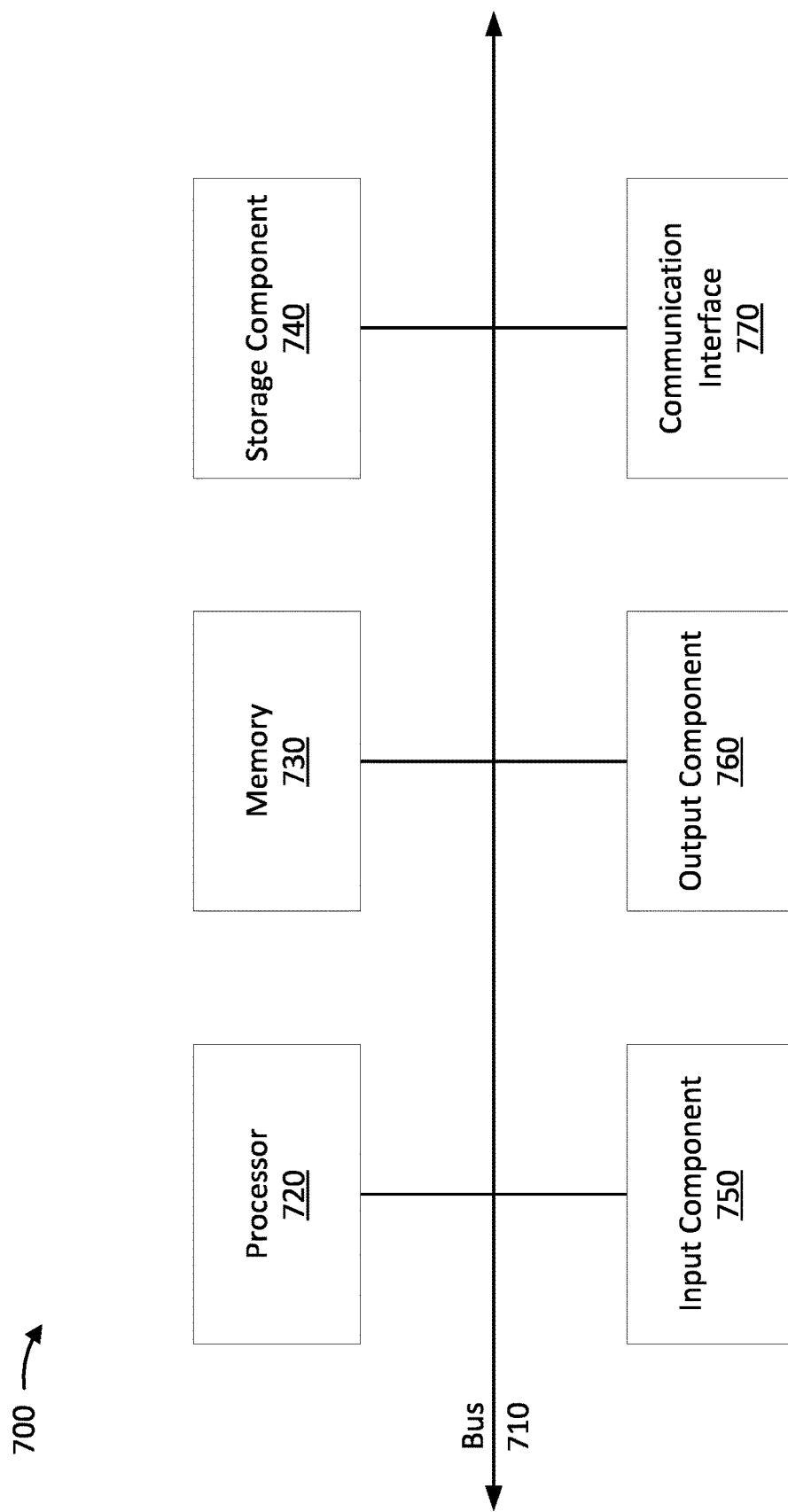

FIG. 6 is an illustration of an example process associated with customized filtering of transmissions from a device, according to various aspects of the present disclosure FIG. 7 is an illustration of example devices associated with customized filtering of transmissions from a device, according to various aspects of the present disclosure.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

For the purposes of promoting an understanding of the principles of the present disclosure, reference will now be made to the aspects illustrated in the drawings, and specific language may be used to describe the same. It will nevertheless be understood that no limitation of the scope of the disclosure is intended. Any alterations and further modifications to the described devices, instruments, methods, and any further application of the principles of the present disclosure are fully contemplated as would normally occur to one skilled in the art to which the disclosure relates. In particular, it is fully contemplated that the features, components, and/or steps described with respect to one aspect may be combined with the features, components, and/or steps described with respect to other aspects of the present disclosure. For the sake of brevity, however, the numerous iterations of these combinations may not be described separately. For simplicity, in some instances the same reference numbers are used throughout the drawings to refer to the same or like parts.

FIG. 1 is an illustration of an example 100 associated with customized filtering of transmissions from a device, according to various aspects of the present disclosure. Example 100 shows an architectural depiction of included components. In some aspects, the components may include one or more user devices 102 in communication with a cyber security service provider (CSP) control infrastructure 104 for the purpose of customized filtering of transmissions from a device to be received by the one or more user devices 102 from a host device 106. A user device 102 may include a web application 108 and a processing unit 110. The CSP control infrastructure 104 may include a security device 112, a processing unit 114, and a security database 116 to enable provision of the customized filtering of transmissions from a device. In some aspects, the user device 102, the CSP control infrastructure 104, and the host device 106 may communicate with may communicate with each other without the communications reaching an open network 118.

In some aspects, the CSP control infrastructure 104 may be owned and operated by a cyber security service provider for purposes of, for example, providing customized filtering of the network services. The CSP control infrastructure 104 may include a combination of hardware and software components that enable the customized filtering of the network services. In an example, the processing unit 114 may include a logical unit (e.g., processor 720) including a logical component configured to perform complex operations associated with the CSP control infrastructure 104, as discussed elsewhere herein. As discussed in further detail with respect to FIG. 2, the security device 112 associated with the CSP control infrastructure 104 may interface with a web application installed on an entity (e.g., a user device 102) to receive data transmitted by the user device 102 to the host device 106, and enable customized filtering of the network services. In some aspects, the security device may include a server configured by the processing unit 114 to perform the customized filtering of transmission packets.

The CSP control infrastructure 104 may utilize an application programming interface (API) to interface with the web application, the API including one or more endpoints to a defined request-response message system. In some aspects, the API may be configured to receive, via the network, a connection request from the user device 102 to connect with the CSP control infrastructure 104 for purposes of obtaining customized filtering of the network services. The connection request may include an authentication request to authenticate the user device 102 and/or to obtain the customized filtering of the network services.

The API may further be configured to handle the connection request(s) by mediating the authentication request. For instance, the API may receive from the user device 102 credentials including, for example, a unique combination of a user ID and password for purposes of authenticating the user device 102. In another example, the credentials may include a unique validation code or a one-time passcode known to an authorized user. The API may provide the received credentials to the processing unit 104 for verification. The processing unit 104 may communicate with the security database 106 to authenticate the user device 102.

The security database 116 may include a structured repository of valid credentials belonging to authorized users. In one example, the structured repository may include one or more tables containing valid unique combinations of user IDs and passwords belonging to authorized users. In another example, the structured repository may include one or more tables containing valid unique validation codes or one-time passcodes associated with authorized users. The cyber security service provider may add or delete such valid unique combinations of user IDs and passwords from the structured repository at any time. Based at least in part on receiving the credentials from the API, the processing unit 114 may verify the received credentials by matching the received credentials with the valid credentials stored in the structured repository. In some aspects, the security database 116 and the processing unit 114 may authenticate the user device 102 when the received credentials match at least one of the valid credentials. In this case, the CSP control infrastructure 104 may enable the user device 102 to connect with the CSP control infrastructure 104 and to receive the customized filtering of the network services. When the received credentials fail to match at least one of the valid credentials, the user database 116 and the processing unit 114 may fail to authenticate the user device 102. In this case, the VSP control infrastructure 104 may decline to connect with the user device 102 and/or to provide the customized filtering of the network services.

The user device 102 may utilize the web application 108 and/or the processing unit 110 to access the CSP control infrastructure 104 and/or communicate with the host device 106. The processing unit 110 may include a logical unit (e.g., processor 720) including a logical component configured to perform complex operations associated with the user device 102, as discussed elsewhere herein. Non-limiting examples of the user device 102 include, for example, a laptop, a mobile phone, a tablet computer, a desktop computer, a server computer, a smart device, a router, an Internet-of-Things (IoT) device such as a smart home appliance, a smart home security system, an autonomous vehicle, a smart health monitor, smart factory equipment, a wireless inventory tracker, a biometric scanner, or a combination thereof.

In some aspects, the web application one installed by the user device 102 may include a client application configured and provided by the CSP control infrastructure 104 to enable the user device 102 to access the CSP control infrastructure 104 and/or to obtain the customized filtering of the network services. In another example, the web application may include a web browser configured by the CSP control infrastructure 104 to execute a cyber security script provided by the CSP control infrastructure 104 to enable the entity to access the CSP control infrastructure 104 and/or to obtain the customized filtering of the network services.

The network 118 may include any digital network that permits several nodes to share and access resources. In some aspects, the network 118 may include one or more of, for example, a local-area network (LAN), a wide-area network (WAN), a campus-area network (CAN), a metropolitan-area network (MAN), a home-area network (HAN), Internet, Intranet, Extranet, and Internetwork.

In some aspects, the one or more user devices 102 may be associated with an entity (e.g., home network, business network, etc.) that may establish a business relationship with the cyber security provider to enable the one or more user devices 102 to receive the customized filtering of the network services. As discussed in further detail with respect to FIG. 2, the entity may communicate with the CSP control infrastructure 104 to set respective policies associated with the one or more user devices 102 receiving customized filtering of the network services. The CSP control infrastructure 104 may store a correlation of the respective policies associated with the one or more user devices 102. As a result, the CSP control infrastructure 104 may enable a first user device 102 to receive filtering of the network services customized for the first user device 102 according to a first policy, a second user device 102 to receive filtering of the network services customized for the second user device 102 according to a second policy, and so on.

In some aspects, the respective policies may be set to enable tiered filtering of the network services. In an example, the respective policies may enable a first group of user devices 102 to obtain available network services subject to tier-1 filtering, a second group of user devices 102 to obtain the available network services subject to tier-2 filtering, a third group of user devices 102 to obtain the available network services subject to tier-3 filtering, and so on.

One or more components (e.g., processing units, security database, web applications, security device, host device, user device, etc.) included in example 100 shown in FIG. 1 may further be associated with a controller/processor, a memory, a communication interface, or a combination thereof (e.g., FIG. 7). For instance, the one or more components may include or may be included in a controller/processor, a memory, or a combination thereof. In some aspects, the one or more components included may be separate and distinct from each other. Alternatively, in some aspects, the one or more of the components may be combined with another one of the one or more components. In some aspects, the one or more components may be local with respect to another one of the one or more components. Alternatively, in some aspects, the one or more components may be located remotely with respect to another one of the one or more components. Additionally, or alternatively, the one or more components may be implemented at least in part as software stored in a memory for execution by a processor. For example, a component (or a portion of a component) may be implemented as instructions or code stored in a non-transitory computer-readable medium and executable by a controller or a processor to perform the functions or operations of the component. Additionally, the one or more components may be configured to perform one or more functions described as being performed by another one of the one or more components.

As indicated above, FIG. 1 is provided as an example. Other examples may differ from what is described with regard to FIG. 1.

An entity (e.g., home network, business network, etc.) may enable associated user devices (e.g., mobile phones, desktop computers, laptops, tablets, smart devices, etc.) to connect with a private network (e.g., intranet, virtual private network, etc.) owned and managed by the entity. While connected to the private network, the user devices may communicate (e.g., transmit and/or receive) information and/or messages with other devices (e.g., host devices) on the open internet. To do so, the user devices may have unfiltered access to network services on the open internet.

Such unfiltered access to the network resources may subject the communicated information and/or messages, which may include private information and/or sensitive data associated with the user devices and/or the entity, to a cybercrime. For instance, a malicious party may exploit the unfiltered access by the user devices to attempt to steal, alter, disable, expose, or destroy the private information and/or sensitive data.

Additionally, the malicious party may gain unauthorized access to the user devices and/or to the private network. Based at least in part on gaining the unauthorized access, the malicious party may introduce malware in the user devices and/or the private network, the malware being designed to disrupt and/or damage operation of the user devices and/or the private network. In an example, the malware may adversely affect operating systems utilized by the user devices such that the operating systems may run slower and/or associated circuitry may emit excessive heat and/or noise, thereby causing damage. Further, the malware may execute unauthorized transmission and/or deletion of the private information from memories associated with the user devices and/or the private network.

The user devices and/or the entity may expend various resources (e.g., processing resources, management resources, memory resources, bandwidth resources, network resources, financial resources, power consumption resources, battery life, or the like) in efforts to mitigate effects of the cybercrime.

Various aspects of systems and techniques discussed in the present disclosure enable customized filtering of transmissions from a device. In some aspects, a cyber security service provider may utilize a CSP control infrastructure to provide the customized filtering of transmissions from user devices. The customized filtering may include the CSP control infrastructure inspecting and selectively blocking internet protocol (IP) packets transmitted by the user devices, that are connected to the private network, from reaching the open internet. In some aspects, the blocking of the IP packets may be according to set policies. For instance, the CSP control infrastructure may enable the user devices and/or an entity associated with the user devices to set up filtering policies associated with blocking the IP packets. In some aspects, respective filtering policies may be set to apply to transmissions by different user devices. In an example, a first filtering policy may be set to apply to a transmission by a first group of user devices, a second filtering policy may be set to apply to transmissions by a second group of user devices, and so on. The CSP control infrastructure may store the respective filtering policies in correlation with the group of user devices to which the respective filtering policies apply. When a user device transmits an IP packet, the CSP control infrastructure may determine whether the user device is permitted to transmit the IP packet in accordance with the applicable filtering policy. In an example, when a first user device from the first group transmits an IP packet, the CSP control infrastructure may determine whether the first user device is permitted to transmit the IP packet in accordance with the first filtering policy, when a second user device from the second group transmits an IP packet, the CSP control infrastructure may determine whether the second user device is permitted to transmit the IP packet in accordance with the second filtering policy, and so on. To determine whether a user device is permitted to transmit the IP packet, the CSP control infrastructure may analyze information included in a header and/or payload of the transmitted IP packet. In an example, such information may include domain information indicating a domain of a host device that is a destination of the transmitted IP packet. In another example, such information may include subnet information indicating an IP address and/or port associated with a destination of the IP packet. The subnet information may also include protocol information indicating a protocol or a sub-protocol utilized to transmit the transmitted IP packet. In this way, by enabling customized filtering of transmission packets according to the respective filtering policies, the CSP control infrastructure may mitigate instances of a malicious party attempting to steal, alter, disable, expose, or destroy private information and/or sensitive data. Additionally, the CSP control infrastructure may mitigate instances of the malicious party gaining unauthorized access to a user device and/or a private network associated with the user device and/or the entity. As a result, the CSP control infrastructure may enable efficient utilization of various resources (e.g., processing resources, management resources, memory resources, bandwidth resources, network resources, financial resources, power consumption resources, battery life, or the like) associated with the user device and/or an entity for more suitable tasks.

In some aspects, a processor (e.g., processing unit 114) associated with an infrastructure device (e.g., security device 112) may receive, from a user device that is in a private network, a transmission packet for communication to a destination device over the open internet; determine, based at least in part on an internet protocol (IP) address associated with the destination device, whether the user device is permitted to transmit the transmission packet to the IP address over the open internet; determine, based at least in part on determining that the user device is permitted to transmit the transmission packet to the IP address, whether the user device is permitted to transmit the transmission packet to a port associated with the IP address; determine, based at least in part on determining that the user device is permitted to transmit the transmission packet to the port, whether the user device is permitted to utilize a protocol utilized by the user device to transmit the transmission packet; and determine, based at least in part on determining that the user device is permitted to utilize the protocol, whether the user device is permitted to utilize a web application utilized by the user device to transmit the transmission packet.

FIG. 2 is an illustration of an example flow 200 associated with customized filtering of transmissions from a device, according to various aspects of the present disclosure. The example flow 200 may include one or more user devices (e.g., user device 102) and a CSP control infrastructure (e.g., CSP control infrastructure 104) in communication with each other. In some aspects, the one or more user devices may be in communication with a security device (e.g., security device 112) associated with the CSP control infrastructure. The one or more user devices and/or the security device may be connected to a private network associated with an entity (e.g., home network, business network, etc.). The CSP control infrastructure 104 may include a processing unit 114 and a security database 106 to enable provision of the customized filtering transmissions.

A user device 102 may include a web application 108 and a processing unit 110. In some aspects, the web application 108 may enable the user device 102 to receive information to be processed by the web application 108 and/or by the CSP control infrastructure 104. The web application 108 may include a graphical user interface to receive the information via a local input interface (e.g., touch screen, keyboard, mouse, pointer, etc.) associated with the user device 102. The information may be received via text input or via a selection from among a plurality of options (e.g., pull down menu, etc.). In some aspects, the web application 108 may activate and/or enable, at an appropriate time, the graphical interface for receiving the information. For instance, the web application 108 may cause a screen (e.g., local screen) associated with the user device 102 to display, for example, a pop-up message to request entry of the information. Further, the web application 108 may enable transmission of at least a portion of the information to the CSP control infrastructure 104. In some aspects, the web application 108 may utilize the processing unit 110 to perform processes/operations associated with customized filtering of transmissions.

As discussed above with respect to FIG. 1, the one or more user devices may be associated with the entity, which may wish to protect the one or more user devices and/or the private network from a cybercrime. The entity may enter into a business relationship with the CSP control infrastructure 104 to obtain customized filtering of transmissions transmitted by the one or more user devices. In some aspects, the entity may establish an account with the CSP control infrastructure 104. The entity may register the one or more user devices with the established account and/or enable the one or more user devices to communicate with the CSP control infrastructure to register with the established account. During the registration, as shown by reference numeral 205, the entity and/or a user device 102 may provide registration information associated with the user device 102 to the security device 112. Such registration information may include, for example, identity of an owner of the user device 102, a phone number associated with the user device 102, an email address associated with the user device 102, biometric information of a user associated with the user device 102, an IP address and/or a medium access control (MAC) address associated with the user device 102, group information indicating a group of user devices to which the user device 102 belongs, or the like.

In some aspects, the user device 102 may set up an access system including, for example, username, password, or the like to subsequently gain access to the established account. In a similar and/or analogous manner, all of the one or more user devices may be registered with the CSP control infrastructure 104. The CSP control infrastructure 104 may store in a memory (e.g., security database 116) the registration information associated with the one or more user devices in correlation with the account established by the entity.

To enable the customized filtering, as further shown by reference numeral 205, the entity and/or the user device 102 may provide policy information associated with the established account. The policy information may indicate custom policies for each group of user devices associated with the entity. In other words, the policy information may indicate custom policies to be applied to transmissions from a user device based at least in part on the group to which the user device belongs. Because applying custom policies to transmissions from the user device may include blocking transmissions from the user device from reaching the open Internet, the policy information may indicate custom policies to be applied for blocking transmissions from the user device from reaching the open Internet based at least in part on the group to which the user device belongs.

In an example, the policy information may indicate a first filtering policy that is to be applied for blocking transmissions from a first user device 102 based at least in part on the first user device 102 belonging to a first group of user devices. The first group of user devices may be associated with a tier-1 group of user devices having tier-1 level permission to communicate over the open Internet. The first group of user devices may include user devices that are permitted to freely communicate (e.g., transmit and/or receive) with all domains associated with destination devices (e.g., host device 106) on the open Internet. For instance, when the entity is a home network, and the first group of user devices includes user devices utilized by adults (e.g., parents), the first group of user devices may freely communicate with all domains on the open Internet. Similarly, when the entity is a business network, and the first group of user devices includes user devices utilized by executives of the business, the first group of user devices may freely communicate with all domains on the open Internet. Additionally, the first group of user devices may be permitted to utilize all available protocols and/or web applications to freely communicate over the open Internet. In this case, the first filtering policy may indicate that transmissions from the first user device are not to be blocked.

In another example, the policy information may indicate a second filtering policy that is to be applied for blocking transmissions from a second user device 102 based at least in part on the second user device 102 belonging to a second group of user devices. The second group of user devices may be associated with a tier-2 group of user devices having tier-2 level permission to communicate over the open Internet. For instance, the second group of user devices may include user devices that are not permitted to communicate with a first subset of domains associated with destination devices on the open Internet. When the entity is a home network, and the second group of user devices includes user devices utilized by children, the second group of user devices may not communicate with domains containing information unsuitable for children. Such unsuitable information may include information associated with violence, cruelty, gambling, smoking, consuming alcohol and/or drugs, or the like. When the entity is a business network, and the second group of user devices includes user devices utilized by managers of the business, the second group of user devices may not communicate with domains associated with, for example, online gaming, gambling, or the like. In this case, the second filtering policy may indicate that transmissions from the second user device to communicate with the first subset of domains are to be blocked.

Additionally, the second group of user devices may not be permitted to utilize a first set of protocols to communicate over the open Internet. In an example, the second user device may not be permitted to utilize protocols including, for example, an unsecure protocol (e.g., hypertext transfer protocol (HTTP), file transfer protocol (FTP), etc.) and/or suspect protocols associated with nefarious platforms (e.g., dark web, torrents, encrypted messengers, etc.). In some aspects, the policy information may indicate a range of IP addresses and/or a range of ports associated with the domain and/or the sub-domain and/or the sub-directory with which the second user device is permitted to (or not permitted to) communicate. In some aspects, the policy information may indicate one or more specific signatures associated with web applications (e.g., web browsers, client applications, etc.) that may make the user device and/or the private network susceptible to a cybercrime. The second user device may not be permitted to utilize such a web application to transmit a transmission packet.

In yet another example, the policy information may indicate a third filtering policy that is to be applied for blocking transmissions from a third user device 102 based at least in part on the third user device 102 belonging to a third group of user devices. In an example, the third group of user devices may be associated with a tier-3 group of user devices having tier-3 level permission to communicate over the open Internet. For instance, the third group of user devices may include user devices that are not permitted to communicate with a second subset of domains associated with devices on the open Internet. In some aspects, the second subset of domains may include the first subset of domains in addition to other domains. In some aspects, the entity is a home network, and the third group of user devices includes smart user devices (e.g., smart refrigerator, smart thermostat, smart security device, etc.), the third group of user devices may not communicate with any domain on the open Internet. When the entity is a business network, and the third group of user devices includes user devices utilized by employees of the business, the third group of user devices may not communicate with domains associated with, for example, online gaming, gambling, social media, dark web, personal messaging, or the like. In this case, the third filtering policy may indicate that transmissions from the third user device to communicate with the second subset of domains are to be blocked.

Additionally, the third group of user devices may not be permitted to utilize a second set of protocols to communicate over the open Internet. In some aspects, the second subset of protocols may include the first subset of protocols in addition to other protocols. In an example, the third user device may not be permitted to utilize protocols including, for example, an unsecure protocol (e.g., hypertext transfer protocol (HTTP), file transfer protocol (FTP), etc.) and/or suspect protocols associated with nefarious platforms (e.g., dark web, torrents, encrypted messengers, etc.). In some aspects, the policy information may also indicate a range of IP addresses and/or a range of ports associated with the domain and/or the sub-domain and/or the sub-directory with which the third user device is permitted to (or not permitted to) communicate. In some aspects, the policy information may indicate one or more specific signatures associated with web applications (e.g., web browsers, client applications, etc.) that may make the third user device and/or the private network susceptible to a cybercrime. The third user device may not be permitted to utilize such a web application to transmit a transmission packet.

In some aspects, the policy information may also indicate that a user device (e.g., second user device, third user device, etc.) may communicate with a given domain, but may not communicate with a given sub-domain and/or a subdirectory associated with the given domain. In an example, the second user device may be permitted to communicate with, for example, a domain (e.g., homepage) associated with a social network (e.g., Facebook), but may not be permitted to communicate with a sub-domain and/or a sub-directory (e.g., Facebook messenger) associated with the social network. In some aspects, the second user device may be permitted to communicate with another sub-domain and/or another sub-directory (e.g., Facebook marketplace) associated with the social network. In another example, the third user device may be permitted to communicate with, for example, a domain (e.g., homepage) associated with a news outlet (e.g., CNN), but may not be permitted to communicate with a sub-domain and/or a sub-directory (e.g., streaming and/or downloading multimedia content) associated with the news outlet. In some aspects, the third user device may be permitted to communicate with another sub-domain and/or another sub-directory (e.g., international news) associated with the news outlet.

In some aspects, the policy information may indicate that a user device (e.g., second user device, third user device, etc.) may communicate with a given sub-domain and/or a sub-directory associated with a given domain, but may not communicate with the given domain. In an example, the user device may be permitted to communicate, with for example, a sub-domain and/or a sub-directory (e.g., Google docs) to enable completion of word processing tasks, but may not be permitted to communicate with a domain (e.g., Google) to avoid collection of private information associated with the user device and/or the entity. The CSP control infrastructure 104 may store in the memory (e.g., security database 116) the policy information associated with the one or more user devices in correlation with the account established by the entity.

During operation, as shown by reference numeral 210, the user device 102 may transmit a transmission packet to communicate with a device on the open Internet. Prior to the transmission packet being communicated over the open Internet, the transmission packet may be received by the security device 112. In some aspects, the transmission packet may include an Internet protocol (IP) packet.

Based at least in part on receiving the transmission packet, as shown by reference numeral 215, the security device 112 may perform the customized filtering based at least in part on the registration information and the policy information. In some aspects, the security device 112 may determine the group of users to which the user device 102 belongs. In an example, the security device 112 may determine whether the user device 102 belongs to the first group of user devices, the second group of user devices, or the third group of user devices. Based at least part on determining the group of users to which the user device 102 belongs, the security device 112 may determine the filtering policy to be utilized to selectively block transmission of the transmission packet. For instance, when the security device determines that the user device 102 belongs to the first group of user devices, the security device 112 may determine that the first filtering policy is to be utilized to selectively block transmission of the transmission packet. Also, when the security device determines that the user device 102 belongs to the second group of user devices, the security device 112 may determine that the second filtering policy is to be utilized to selectively block transmission of the transmission packet. Further, when the security device determines that the user device 102 belongs to the third group of user devices, the security device 112 may determine that the third filtering policy is to be utilized to selectively block transmission of the transmission packet.

When the security device 112 determines that the user device 102 belongs to the first group of user devices, the security device 112 may determine that the transmission packet is to be communicated over the open Internet without inspecting the packet and/or without filtering. Alternatively, when the security device 112 determines that the user device 102 belongs to the second group of user devices or to the third group of user devices, the security device 112 may select to inspect the transmission packet.

While inspecting the transmission packet, the security device 112 may determine domain information indicated in the transmission packet. In some aspects, the domain information may include a descriptive string of characters generally indicating a domain and/or a sub-domain and/or a sub-directory to which the transmission packet is to be transmitted over the open Internet. The security device 112 may compare the indicated domain information with stored domain information (e.g., domain and/or sub-domain and/or sub-directory) to determine whether the user device 102 is permitted to transmit the transmission packet to the indicated domain and/or the sub-domain and/or the sub-directory. In example, when the indicated domain and/or sub-domain and/or sub-directory matches the stored domain and/or sub-domain and/or sub-directory with which the user device 102 is permitted to communicate (or fails to match the stored domain and/or sub-domain and/or sub-directory with which the user device is not permitted to communicate), the security device 112 may determine that the user device 102 is permitted to transmit the transmission packet to the indicated domain and/or sub-domain and/or sub-directory.

In this case, the security device 112 may transmit the domain information to an associated domain name services (DNS) server. In this case, the DNS server may resolve the domain information and return to the security device 112 communication information (e.g., IP address, etc.) associated with the domain information. Based at least in part on receiving the communication information, the security device 112 may compare the received communication information with stored communication information associated with stored communication information (e.g., IP address) to determine whether the user device 102 is permitted to transmit the transmission packet. In an example, when the received IP address falls within the range of IP addresses to which the user device 102 is permitted to transmit (or fails to fall within the range of IP addresses to which the user device 102 is not permitted to transmit), the security device 112 may determine that the user device 102 is permitted to transmit the transmission packet to the IP address returned by the DNS server.

In this case, the security device 112 may determine a port associated with the IP address returned by the DNS server. In some aspects, to determine the port, the security device 112 may enable transmission of the IP packet to the domain and/or sub-domain and/or sub-directory for the purposes of conducting an initial handshake procedure. Based at least in part on the handshake procedure being conducted, a temporary session maybe established with the domain and/or sub-domain and/or sub-directory. As a result of the temporary session being established, the port associated with the IP address utilized to establish the active session may be determined. The security device 112 may compare the determined port with a stored the range of ports to determine whether the user device 102 is permitted to transmit the transmission packet. In an example, when the determined port fails to fall within the range of ports to which the user device 102 is permitted to transmit (or falls within the range of ports to which the user device 102 is not permitted to transmit), the security device 112 may determine that the user device 102 is not permitted to transmit the transmission packet to the determined port. In this case, the security device 112 may terminate the temporary session. Alternatively, when the determined port falls within the range of ports to which the user device 102 is permitted to transmit (or fails to fall within the range of ports to which the user device 102 is not permitted to transmit), the security device 112 may determine that the user device 102 is permitted to transmit the transmission packet to the determined port.

In this case, the security device 112 may inspect a payload included in the transmission packet to determine a protocol being utilized by the user device 102 to transmit the transmission packet. The security device 112 may compare the determined protocol with a stored protocol to determine whether the user device 102 is permitted to transmit the transmission packet. In an example, when the determined protocol matches a protocol that the user device 102 is permitted to utilize to transmit (or fails to match a protocol that the user device 102 is not permitted to utilize to transmit), the security device 112 may determine that the user device 102 is permitted to transmit the transmission packet utilizing the protocol.

In this case, the security device 112 may further inspect the payload to determine one or more specific signatures associated with a web application utilized to transmit the transmission packet. In some aspects, the web application may include in the payload of the transmission packet a signature specific to the web application. In some aspects, the signature may be in plaintext (e.g., alphanumeric characters). In some aspects, the signature may be encoded (e.g., hex or binary). The security device 112 may compare the determined one or more specific signatures with stored one or more specific signatures to determine whether the user device 102 is permitted to utilize the web application to transmit the transmission packet. In an example, when the determined one or more specific signatures matches one or more specific signatures associated with web applications that the user device 102 is permitted to utilize to transmit (or fails to match one or more specific signatures associated with web applications that the user device 102 is not permitted to utilize to transmit), the security device 112 may determine that the user device 102 is permitted to transmit the transmission packet utilizing the web application. In this case, the security device 112 may transmit the packet over the open internet to the destination device.

Alternatively, when the security device 112 determines that the user device 102 is not permitted to transmit the transmission packet to the domain and/or sub-domain and/or sub-directory, and/or that the user device 102 is not permitted to transmit to the IP address, and/or that the user device is not permitted transmit to the port, and/or that the user device 102 is not permitted to utilize the determined protocol, and/or that the user device is not permitted to utilize the determined web application, the security device 112 may block transmission of the transmission packet. In some aspects, the security device 112 may discard the transmission packet. In some aspects, the security device 112 may transmit a feedback message to the user device 102 indicating that the user device 102 is not permitted to transmit the transmission packet.

In this way, by enabling customized filtering of transmission packets according to the respective filtering policies as discussed herein, the CSP control infrastructure may mitigate instances of a malicious party attempting to steal, alter, disable, expose, or destroy private information and/or sensitive data. Additionally, the CSP control infrastructure may mitigate instances of the malicious party gaining unauthorized access to a user device and/or a private network associated with the user device and/or an associated entity. As a result, the CSP control infrastructure may enable efficient utilization of various resources (e.g., processing resources, management resources, memory resources, bandwidth resources, network resources, financial resources, power consumption resources, battery life, or the like) associated with the user device and/or an entity for more suitable tasks.

FIG. 3 is an illustration of an example process 300 associated with customized filtering of transmissions from a device, according to various aspects of the present disclosure. In some aspects, the process 300 may be performed by memories and/or processors/controllers (e.g., processor 720) associated with a security device (e.g., security device 112). As shown by reference numeral 310, process 300 may include receiving, by a security device from a user device that is in a private network, a transmission packet for communication to a destination device over an open internet. For instance, the security device may utilize an associated communication interface (e.g., communication interface 770) along with the associated memory and/or processor to receive, from a user device that is in a private network, a transmission packet for communication to a destination device over an open internet, as discussed elsewhere herein.

As shown by reference numeral 320, process 300 may include determining, by the security device based at least in part on an internet protocol (IP) address associated with the destination device, whether the user device is permitted to transmit the transmission packet to the IP address over the open internet. For instance, the security device may utilize the associated communication interface, memory, and/or processor to determine, based at least in part on an internet protocol (IP) address associated with the destination device, whether the user device is permitted to transmit the transmission packet to the IP address over the open internet, as discussed elsewhere herein.

As shown by reference numeral 330, process 300 may include determining, by the security device based at least in part on determining that the user device is permitted to transmit the transmission packet to the IP address, whether the user device is permitted to transmit the transmission packet to a port associated with the IP address. For instance, the manager device may utilize the associated memory and/or processor to determine, based at least in part on determining that the user device is permitted to transmit the transmission packet to the IP address, whether the user device is permitted to transmit the transmission packet to a port associated with the IP address, as discussed elsewhere herein.

As shown by reference numeral 340, process 300 may include determining, by the security device based at least in part on determining that the user device is permitted to transmit the transmission packet to the port, whether the user device is permitted to utilize a protocol utilized by the user device to transmit the transmission packet. For instance, the manager device may utilize the associated communication interface, memory, and/or processor to determine, based at least in part on determining that the user device is permitted to transmit the transmission packet to the port, whether the user device is permitted to utilize a protocol utilized by the user device to transmit the transmission packet, as discussed elsewhere herein.

As shown by reference numeral 350, process 300 may include determining, by the security device based at least in part on determining that the user device is permitted to utilize the protocol, whether the user device is permitted to utilize a web application utilized by the user device to transmit the transmission packet. For instance, the security device may utilize the associated memory and/or processor to determine, based at least in part on determining that the user device is permitted to utilize the protocol, whether the user device is permitted to utilize a web application utilized by the user device to transmit the transmission packet, as discussed elsewhere herein.

Process 300 may include additional aspects, such as any single aspect or any combination of aspects described below and/or in connection with one or more other processes described elsewhere herein.

In a first aspect, in process 300, determining whether the user device is permitted to transmit the transmission packet to the IP address includes the security device determining whether the IP address falls with a range of IP addresses to which the user device is permitted to transmit.

In a second aspect, alone or in combination with the first aspect, in process 300, determining whether the user device is permitted to transmit the transmission packet to the port includes the security device determining whether the port falls with a range of ports to which the user device is permitted to transmit.

In a third aspect, alone or in combination with the first through second aspects, in process 300, determining whether the user device is permitted to utilize the protocol to transmit the transmission packet includes the security device determining that the protocol matches a stored protocol that the user device is permitted to utilize to transmit.

In a fourth aspect, alone or in combination with the first through third aspects, in process 300, determining whether the user device is permitted to utilize the web application includes the security device determining that a signature included in the transmission packet matches a signature associated with an application that the user device is permitted to utilize to transmit.

In a fifth aspect, alone or in combination with the first through fourth aspects, process 300 may include transmitting, by the security device based at least in part on determining that the user device is permitted to utilize the web application, the transmission packet to the destination device over the open internet.

In a sixth aspect, alone or in combination with the first through fifth aspects, process 300 may include determining, by the security device, the IP address based at least in part on domain information indicated in the transmission packet.

Although FIG. 3 shows example blocks of the process, in some aspects, the process may include additional blocks, fewer blocks, different blocks, or differently arranged blocks than those depicted in FIG. 3. Additionally, or alternatively, two or more of the blocks of the process may be performed in parallel.

As indicated above, FIG. 3 is provided as an example. Other examples may differ from what is described with regard to FIG. 3.

FIG. 4 is an illustration of an example process 400 associated with customized filtering of transmissions from a device, according to various aspects of the present disclosure. In some aspects, the process 400 may be performed by a memory and/or a processor/controller (e.g., processor 720) associated with a security device (e.g., security device 112). As shown by reference numeral 410, process 400 may include receiving, by a security device, registration information indicating groups to which user devices belong. For instance, the security device may utilize an associated communication interface (e.g., communication interface 770) with the associated memory and/or processor to receive registration information indicating groups to which user devices belong, as discussed elsewhere herein.

As shown by reference numeral 420, process 400 may include receiving, by the security device, policy information indicating respective filtering policies for each group of user devices. For instance, the security device may utilize the associated communication interface, memory, and/or processor to receive policy information indicating respective filtering policies for each group of user devices, as discussed elsewhere herein.

As shown by reference numeral 430, process 400 may include receiving, from a user device, a transmission packet for transmission to a destination device over an open internet. For instance, the security device may utilize the associated communication interface, memory, and/or processor to receive a transmission packet for transmission to a destination device over an open internet, as discussed elsewhere herein.

As shown by reference numeral 440, process 400 may include determining, by the security device based at least in part on the registration information, the group of user devices to which the user device belongs. For instance, the user device may utilize the associated memory and/or processor to determine, based at least in part on the registration information, the group of user devices to which the user device belongs, as discussed elsewhere herein.

As shown by reference numeral 450, process 400 may include determining, by the security device based at least in part on the policy information and on determining the group of user devices to which the user device belongs, whether the user device is permitted to transmit the transmission packet to the destination device over the open internet. For instance, the user device may utilize the associated memory and/or processor to determine, based at least in part on the policy information and on determining the group of user devices to which the user device belongs, whether the user device is permitted to transmit the transmission packet to the destination device over the open internet, as discussed elsewhere herein.

As shown by reference numeral 460, process 400 may include selectively blocking, by the security device, transmission of the transmission packet based at least in part on determining whether the user device is permitted to transmit the transmission packet to the destination device over the open internet. For instance, the user device may utilize the associated memory and/or processor to selectively block transmission of the transmission packet based at least in part on determining whether the user device is permitted to transmit the transmission packet to the destination device over the open internet, as discussed elsewhere herein.

Process 400 may include additional aspects, such as any single aspect or any combination of aspects described below and/or in connection with one or more other processes described elsewhere herein.

In a first aspect, in process 400, determining whether the user device is permitted to transmit the transmission packet includes the security device determining whether the user device is permitted to transmit the transmission packet to an internet protocol (IP) address associated with the destination device.

In a second aspect, alone or in combination with the first aspect, in process 400, determining whether the user device is permitted to transmit the transmission packet includes the security device determining whether the user device is permitted to transmit the transmission packet to a port related to an internet protocol (IP) address associated with the destination device.

In a third aspect, alone or in combination with the first through second aspects, in process 400, determining whether the user device is permitted to transmit the transmission packet includes the security device determining whether the user device is permitted to utilize a protocol utilized by the user device to transmit the transmission packet.

In a fourth aspect, alone or in combination with the first through third aspects, in process 400, determining whether the user device is permitted to transmit the transmission packet includes the security device determining whether the user device is permitted to utilize a web application utilized by the user device to transmit the transmission packet.

In a fifth aspect, alone or in combination with the first through fourth aspects, in process 400, selectively blocking transmission of the transmission packet includes transmitting the transmission packet to the destination device on the open internet based at least in part on determining that the user device is permitted to transmit the transmission packet.

In a sixth aspect, alone or in combination with the first through fifth aspects, in process 400, selectively blocking transmission of the transmission packet includes blocking transmission of the transmission packet based at least in part on determining that the user device is not permitted to transmit the transmission packet.

Although FIG. 4 shows example blocks of the process, in some aspects, the process may include additional blocks, fewer blocks, different blocks, or differently arranged blocks than those depicted in FIG. 4. Additionally, or alternatively, two or more of the blocks of the process may be performed in parallel.

As indicated above, FIG. 4 is provided as an example. Other examples may differ from what is described with regard to FIG. 4.

FIG. 5 is an illustration of an example process 500 associated with customized filtering of transmissions from a device, according to various aspects of the present disclosure. In some aspects, the process 500 may be performed by an associated memory (e.g., memory 730) and/or an associated processor (e.g., processing unit 114, processor 720) related to a CSP control infrastructure configured to configure an associated security device (e.g., security device 112).

As shown by reference numeral 510, process 500 includes configuring a security device to receive, from a user device that is in a private network, a transmission packet for communication to a destination device over an open internet. For instance, the CSP control infrastructure may utilize the associated memory and/or processor to configure a security device to receive, from a user device that is in a private network, a transmission packet for communication to a destination device over an open internet, as discussed elsewhere herein.

As shown by reference numeral 520, process 500 includes configuring the security device to determine, based at least in part on an internet protocol (IP) address associated with the destination device, whether the user device is permitted to transmit the transmission packet to the IP address over the open internet. For instance, the CSP control infrastructure may utilize the associated memory and/or processor to configure the security device to determine, based at least in part on an internet protocol (IP) address associated with the destination device, whether the user device is permitted to transmit the transmission packet to the IP address over the open internet, as discussed elsewhere herein.

As shown by reference numeral 530, process 500 includes configuring the security device to determine, based at least in part on determining that the user device is permitted to transmit the transmission packet to the IP address, whether the user device is permitted to transmit the transmission packet to a port associated with the IP address. For instance, the CSP control infrastructure may utilize the associated memory and/or processor to configure the security device to determine, based at least in part on determining that the user device is permitted to transmit the transmission packet to the IP address, whether the user device is permitted to transmit the transmission packet to a port associated with the IP address, as discussed elsewhere herein.

As shown by reference numeral 540, process 500 includes configuring the security device to determine, based at least in part on determining that the user device is permitted to transmit the transmission packet to the port, whether the user device is permitted to utilize a protocol utilized by the user device to transmit the transmission packet. For instance, the CSP control infrastructure may utilize the associated memory and/or processor to configure the security device to determine, based at least in part on determining that the user device is permitted to transmit the transmission packet to the port, whether the user device is permitted to utilize a protocol utilized by the user device to transmit the transmission packet, as discussed elsewhere herein.

As shown by reference numeral 550, process 500 includes configuring the security device to determine, based at least in part on determining that the user device is permitted to utilize the protocol, whether the user device is permitted to utilize a web application utilized by the user device to transmit the transmission packet. For instance, the CSP control infrastructure may utilize the associated memory and/or processor to configure the security device to determine, based at least in part on determining that the user device is permitted to utilize the protocol, whether the user device is permitted to utilize a web application utilized by the user device to transmit the transmission packet, as discussed elsewhere herein.

Process 500 may include additional aspects, such as any single aspect or any combination of aspects described below and/or in connection with one or more other processes described elsewhere herein.

In a first aspect, wherein, in process 500, configuring the security device to determine whether the user device is permitted to transmit the transmission packet to the IP address includes configuring the security device to determine whether the IP address falls with a range of IP addresses to which the user device is permitted to transmit.

In a second aspect, alone or in combination with the first aspect, in process 500, configuring the security device to determine whether the user device is permitted to transmit the transmission packet to the port includes configuring the security device to determine whether the port falls with a range of ports to which the user device is permitted to transmit.

In a third aspect, alone or in combination with the first through second aspects, process 500 may include configuring the security device to determine whether the user device is permitted to utilize the protocol to transmit the transmission packet includes configuring the security device to determine that the protocol matches a stored protocol that the user device is permitted to utilize to transmit.

In a fourth aspect, alone or in combination with the first through third aspects, process 500 may include configuring the security device to determine whether the user device is permitted to utilize the web application includes configuring the security device to determine that a signature included in the transmission packet matches a signature associated with an application that the user device is permitted to utilize to transmit.

In a fifth aspect, alone or in combination with the first through fourth aspects, process 500 may include configuring the security device to transmit, based at least in part on determining that the user device is permitted to utilize the web application, the transmission packet to the destination device over the open internet.

In a sixth aspect, alone or in combination with the first through fifth aspects, process 500 may include configuring the security device to determine the IP address based at least in part on domain information indicated in the transmission packet.

Although FIG. 5 shows example blocks of the process, in some aspects, the process may include additional blocks, fewer blocks, different blocks, or differently arranged blocks than those depicted in FIG. 5. Additionally, or alternatively, two or more of the blocks of the process may be performed in parallel.

As indicated above, FIG. 5 is provided as an example. Other examples may differ from what is described with regard to FIG. 5.

FIG. 6 is an illustration of an example process 600 associated with customized filtering of transmissions from a device, according to various aspects of the present disclosure. In some aspects, the process 600 may be performed by an associated memory (e.g., memory 730) and/or an associated processor (e.g., processing unit 110, processor 720) related to a CSP control infrastructure configured to configure an associated security device (e.g., security device 112). As shown by reference numeral 610, process 600 includes configuring a security device to receive registration information indicating groups to which user devices belong. For instance, the CSP control infrastructure may utilize the associated memory and/or processor to configure a security device to receive registration information indicating groups to which user devices belong, as discussed elsewhere herein.

As shown by reference numeral 620, process 600 includes configuring the security device to receive policy information indicating respective filtering policies for each group of user devices. For instance, the CSP control infrastructure may utilize the associated memory and/or processor to configure the security device to receive policy information indicating respective filtering policies for each group of user devices, as discussed elsewhere herein.

As shown by reference numeral 630, process 600 includes configuring the security device to receive a transmission packet for transmission to a destination device over an open internet. For instance, the CSP control infrastructure may utilize the associated memory and/or processor to configure the security device to receive a transmission packet for transmission to a destination device over an open internet, as discussed elsewhere herein.

As shown by reference numeral 640, process 600 includes configuring the security device to determine, based at least in part on the registration information, the group of user devices to which the user device belongs. For instance, the CSP control infrastructure may utilize the associated memory and/or processor to configure the security device to determine, based at least in part on the registration information, the group of user devices to which the user device belongs, as discussed elsewhere herein.

As shown by reference numeral 650, process 600 includes configuring the security device to determine, based at least in part on the policy information and on determining the group of user devices to which the user device belongs, whether the user device is permitted to transmit the transmission packet to the destination device over the open internet. For instance, the CSP control infrastructure may utilize the associated memory and/or processor to configure the security device to determine, based at least in part on the policy information and on determining the group of user devices to which the user device belongs, whether the user device is permitted to transmit the transmission packet to the destination device over the open internet, as discussed elsewhere herein.

As shown by reference numeral 660, process 600 includes configuring the security device to selectively block transmission of the transmission packet based at least in part on determining whether the user device is permitted to transmit the transmission packet to the destination device over the open internet. For instance, the CSP control infrastructure may utilize the associated memory and/or processor to configure the security device to selectively block transmission of the transmission packet based at least in part on determining whether the user device is permitted to transmit the transmission packet to the destination device over the open internet, as discussed elsewhere herein.

Process 600 may include additional aspects, such as any single aspect or any combination of aspects described below and/or in connection with one or more other processes described elsewhere herein.

In a first aspect, wherein, in process 600, configuring the security device to determine whether the user device is permitted to transmit the transmission packet includes configuring the security device to determine whether the user device is permitted to transmit the transmission packet to an internet protocol (IP) address associated with the destination device.

In a second aspect, alone or in combination with the first aspect, in process 600, configuring the security device to determine whether the user device is permitted to transmit the transmission packet includes configuring the security device to determine whether the user device is permitted to transmit the transmission packet to a port related to an internet protocol (IP) address associated with the destination device.

In a third aspect, alone or in combination with the first through second aspects, in process 600, configuring the security device to determine whether the user device is permitted to transmit the transmission packet includes configuring the security device to determine whether the user device is permitted to utilize a protocol utilized by the user device to transmit the transmission packet.

In a fourth aspect, alone or in combination with the first through third aspects, process 600 may include configuring the security device to determine whether the user device is permitted to transmit the transmission packet includes configuring the security device to determine whether the user device is permitted to utilize a web application utilized by the user device to transmit the transmission packet.

In a fifth aspect, alone or in combination with the first through fourth aspects, in process 600, configuring the security device to selectively block transmission of the transmission packet includes configuring the security device to transmit the transmission packet to the destination device on the open internet based at least in part on determining that the user device is permitted to transmit the transmission packet.

In a sixth aspect, alone or in combination with the first through fifth aspects, in process 600, configuring the security device to selectively block transmission of the transmission packet includes configuring the security device to block transmission of the transmission packet based at least in part on determining that the user device is not permitted to transmit the transmission packet.

Although FIG. 6 shows example blocks of the process, in some aspects, the process may include additional blocks, fewer blocks, different blocks, or differently arranged blocks than those depicted in FIG. 6. Additionally, or alternatively, two or more of the blocks of the process may be performed in parallel.

As indicated above, FIG. 6 is provided as an example. Other examples may differ from what is described with regard to FIG. 6.

FIG. 7 is an illustration of example devices 700 associated with customized filtering of transmissions from a device, according to various aspects of the present disclosure. In some aspects, the example devices 700 may form part of or implement the systems, servers, environments, infrastructures, components, devices, or the like described elsewhere herein (e.g., control infrastructure, distributor device, manager device, user device, etc.) and may be used to perform example processes described elsewhere herein. The example devices 700 may include a universal bus 710 communicatively coupling a processor 720, a memory 730, a storage component 740, an input component 750, an output component 760, and a communication interface 770.

Bus 710 may include a component that permits communication among multiple components of a device 700. Processor 720 may be implemented in hardware, firmware, and/or a combination of hardware and software. Processor 720 may take the form of a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some aspects, processor 720 may include one or more processors capable of being programmed to perform a function. Memory 730 may include a random access memory (RAM), a read only memory (ROM), and/or another type of dynamic or static storage device (e.g., a flash memory, a magnetic memory, and/or an optical memory) that stores information and/or instructions for use by processor 720.

Storage component 740 may store information and/or software related to the operation and use of a device 700. For example, storage component 740 may include a hard disk (e.g., a magnetic disk, an optical disk, and/or a magneto-optic disk), a solid state drive (SSD), a compact disc (CD), a digital versatile disc (DVD), a floppy disk, a cartridge, a magnetic tape, and/or another type of non-transitory computer-readable medium, along with a corresponding drive.

Input component 750 may include a component that permits a device 700 to receive information, such as via user input (e.g., a touch screen display, a keyboard, a keypad, a mouse, a button, a switch, and/or a microphone). Additionally, or alternatively, input component 750 may include a component for determining location (e.g., a global positioning system (GPS) component) and/or a sensor (e.g., an accelerometer, a gyroscope, an actuator, another type of positional or environmental sensor, and/or the like). Output component 760 may include a component that provides output information from device 700 (via, for example, a display, a speaker, a haptic feedback component, an audio or visual indicator, and/or the like).

Communication interface 770 may include a transceiver-like component (e.g., a transceiver, a separate receiver, a separate transmitter, and/or the like) that enables a device 700 to communicate with other devices, such as via a wired connection, a wireless connection, or a combination of wired and wireless connections. Communication interface 770 may permit device 700 to receive information from another device and/or provide information to another device. For example, communication interface 770 may include an Ethernet interface, an optical interface, a coaxial interface, an infrared interface, a radio frequency (RF) interface, a universal serial bus (USB) interface, a Wi-Fi interface, a cellular network interface, and/or the like.

A device 700 may perform one or more processes described elsewhere herein. A device 700 may perform these processes based on processor 720 executing software instructions stored by a non-transitory computer-readable medium, such as memory 730 and/or storage component 740. As used herein, the term "computer-readable medium" may refer to a non-transitory memory device. A memory device may include memory space within a single physical storage device or memory space spread across multiple physical storage devices.

Software instructions may be read into memory 730 and/or storage component 740 from another computer-readable medium or from another device via communication interface 770. When executed, software instructions stored in memory 730 and/or storage component 740 may cause processor 720 to perform one or more processes described elsewhere herein. Additionally, or alternatively, hardware circuitry may be used in place of or in combination with software instructions to perform one or more processes described elsewhere herein. Thus, implementations described herein are not limited to any specific combination of hardware circuitry and software.

The quantity and arrangement of components shown in FIG. 7 are provided as an example. In practice, a device 700 may include additional components, fewer components, different components, or differently arranged components than those shown in FIG. 7. Additionally, or alternatively, a set of components (e.g., one or more components) of a device 700 may perform one or more functions described as being performed by another set of components of a device 700.

As indicated above, FIG. 7 is provided as an example. Other examples may differ from what is described with regard to FIG. 7.

Persons of ordinary skill in the art will appreciate that the aspects encompassed by the present disclosure are not limited to the particular exemplary aspects described herein. In that regard, although illustrative aspects have been shown and described, a wide range of modification, change, and substitution is contemplated in the foregoing disclosure. It is understood that such variations may be made to the aspects without departing from the scope of the present disclosure. Accordingly, it is appropriate that the appended claims be construed broadly and in a manner consistent with the present disclosure.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" or "device" is intended to be broadly construed as hardware, firmware, or a combination of hardware and software. As used herein, a processor is implemented in hardware, firmware, or a combination of hardware and software.

As used herein, satisfying a threshold may, depending on the context, refer to a value being greater than the threshold, greater than or equal to the threshold, less than the threshold, less than or equal to the threshold, equal to the threshold, or not equal to the threshold, among other examples, or combinations thereof.

It will be apparent that systems or methods described herein may be implemented in different forms of hardware, firmware, or a combination of hardware and software. The actual specialized control hardware or software code used to implement these systems or methods is not limiting of the aspects. Thus, the operation and behavior of the systems or methods were described herein without reference to specific software code—it being understood that software and hardware can be designed to implement the systems or methods based, at least in part, on the description herein.

Even though particular combinations of features are recited in the claims or disclosed in the specification, these combinations are not intended to limit the disclosure of various aspects. In fact, many of these features may be combined in ways not specifically recited in the claims or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (for example, a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. An infrastructure device, comprising:
   a memory; and
   a processor communicatively coupled to the memory, the memory and the processor being configured to:
      configure a security device to receive registration information indicating groups to which user devices belong;
      configure the security device to receive policy information indicating respective filtering policies for each group of user devices;
      configure the security device to receive, from a user device, a transmission packet for transmission to a destination device over an open internet;
      configure the security device to determine, based at least in part on the registration information, a group of user devices to which the user device belongs;
      configure the security device to determine, based at least in part on the policy information and on determining the group of user devices to which the user device belongs, whether the user device is permitted to transmit the transmission packet to the destination device over the open internet; and
      configure the security device to selectively block transmission of the transmission packet based at least in part on determining whether the user device is permitted to transmit the transmission packet to the destination device over the open internet.

2. The infrastructure device of claim 1, wherein, to configure the security device to determine whether the user device is permitted to transmit the transmission packet, the memory and the processor are configured to configure the security device to determine whether the user device is permitted to transmit the transmission packet to an internet protocol (IP) address associated with the destination device.

3. The infrastructure device of claim 1, wherein, to configure the security device to determine whether the user device is permitted to transmit the transmission packet, the memory and the processor are configured to configure the security device to determine whether the user device is permitted to transmit the transmission packet to a port related to an internet protocol (IP) address associated with the destination device.

4. The infrastructure device of claim 1, wherein, to configure the security device to determine whether the user device is permitted to transmit the transmission packet, the memory and the processor are configured to configure the security device to determine whether the user device is permitted to utilize a protocol utilized by the user device to transmit the transmission packet.

5. The infrastructure device of claim 1, wherein, to configure the security device to determine whether the user device is permitted to transmit the transmission packet, the memory and the processor are configured to configure the security device to determine whether the user device is permitted to utilize a web application utilized by the user device to transmit the transmission packet.

6. The infrastructure device of claim 1, wherein, to configure the security device to selectively block transmission of the transmission packet, the memory and the processor are configured to configure the security device to transmit the transmission packet to the destination device on the open internet based at least in part on determining that the user device is permitted to transmit the transmission packet.

7. The infrastructure device of claim 1, wherein, to configure the security device to selectively block transmission of the transmission packet, the memory and the processor are configured to configure the security device to block transmission of the transmission packet based at least in part on determining that the user device is not permitted to transmit the transmission packet.

8. A method, comprising:
configuring a security device to receive registration information indicating groups to which user devices belong;
configuring the security device to receive policy information indicating respective filtering policies for each group of user devices;
configuring the security device to receive, from a user device, a transmission packet for transmission to a destination device over an open internet;
configuring the security device to determine, based at least in part on the registration information, a group of user devices to which the user device belongs;
configuring the security device to determine, based at least in part on the policy information and on determining the group of user devices to which the user device belongs, whether the user device is permitted to transmit the transmission packet to the destination device over the open internet; and
configuring the security device to selectively block transmission of the transmission packet based at least in part on determining whether the user device is permitted to transmit the transmission packet to the destination device over the open internet.

9. The method of claim 8, wherein configuring the security device to determine whether the user device is permitted to transmit the transmission packet includes configuring the security device to determine whether the user device is permitted to transmit the transmission packet to an internet protocol (IP) address associated with the destination device.

10. The method of claim 8, wherein configuring the security device to determine whether the user device is permitted to transmit the transmission packet includes configuring the security device to determine whether the user device is permitted to transmit the transmission packet to a port related to an internet protocol (IP) address associated with the destination device.

11. The method of claim 8, wherein configuring the security device to determine whether the user device is permitted to transmit the transmission packet includes configuring the security device to determine whether the user device is permitted to utilize a protocol utilized by the user device to transmit the transmission packet.

12. The method of claim 8, wherein configuring the security device to determine whether the user device is permitted to transmit the transmission packet includes configuring the security device to determine whether the user device is permitted to utilize a web application utilized by the user device to transmit the transmission packet.

13. The method of claim 8, wherein configuring the security device to selectively block transmission of the transmission packet includes configuring the security device to transmit the transmission packet to the destination device on the open internet based at least in part on determining that the user device is permitted to transmit the transmission packet.

14. The method of claim 8, wherein configuring the security device to selectively block transmission of the transmission packet includes configuring the security device to block transmission of the transmission packet based at least in part on determining that the user device is not permitted to transmit the transmission packet.

15. A non-transitory computer-readable medium configured to store instructions, which when executed by a processor associated with an infrastructure device, configure the processor to:
configure a security device to receive registration information indicating groups to which user devices belong;
configure the security device to receive policy information indicating respective filtering policies for each group of user devices;
configure the security device to receive, from a user device, a transmission packet for transmission to a destination device over an open internet;
configure the security device to determine, based at least in part on the registration information, a group of user devices to which the user device belongs;
configure the security device to determine, based at least in part on the policy information and on determining the group of user devices to which the user device belongs, whether the user device is permitted to transmit the transmission packet to the destination device over the open internet; and
configure the security device to selectively block transmission of the transmission packet based at least in part on determining whether the user device is permitted to transmit the transmission packet to the destination device over the open internet.

16. The non-transitory computer-readable medium of claim 15, wherein, to configure the security device to determine whether the user device is permitted to transmit the transmission packet, the processor is configured to configure the security device to determine whether the user device is permitted to transmit the transmission packet to an internet protocol (IP) address associated with the destination device.

17. The non-transitory computer-readable medium of claim 15, wherein, to configure the security device to determine whether the user device is permitted to transmit the transmission packet, the processor is configured to configure the security device to determine whether the user device is permitted to transmit the transmission packet to a port related to an internet protocol (IP) address associated with the destination device.

18. The non-transitory computer-readable medium of claim 15, wherein, to configure the security device to determine whether the user device is permitted to transmit the transmission packet, the processor is configured to configure the security device to determine whether the user device is permitted to utilize a protocol utilized by the user device to transmit the transmission packet.

19. The non-transitory computer-readable medium of claim 15, wherein, to configure the security device to determine whether the user device is permitted to transmit the transmission packet, the processor is configured to configure the security device to determine whether the user device is permitted to utilize a web application utilized by the user device to transmit the transmission packet.

20. The non-transitory computer-readable medium of claim 15, wherein, to configure the security device to selectively block transmission of the transmission packet, the processor is configured to configure the security device to transmit the transmission packet to the destination device on the open internet based at least in part on determining that the user device is permitted to transmit the transmission packet.

* * * * *